United States Patent [19]

Büttner

[11] Patent Number: 5,332,258
[45] Date of Patent: Jul. 26, 1994

[54] MOTOR VEHICLE AXLE SUSPENSION

[75] Inventor: Josef Büttner, Waldaschaff, Fed. Rep. of Germany

[73] Assignee: Otto Sauer Achsenfabrik Keilberg, Bessenbach-Keilberg, Fed. Rep. of Germany

[21] Appl. No.: 665,226

[22] Filed: Mar. 6, 1991

[30] Foreign Application Priority Data

Mar. 10, 1990 [DE] Fed. Rep. of Germany ....... 4007634

[51] Int. Cl.⁵ .............................................. B60G 11/26
[52] U.S. Cl. .................................... 280/704; 280/712; 180/209; 267/31; 267/32; 267/241; 267/256
[58] Field of Search ............... 280/702, 704, 711, 712, 280/713, 715, 718, 697, 698, 699, 714; 180/209; 267/32, 31, 241, 256

[56] References Cited

U.S. PATENT DOCUMENTS

| | | | |
|---|---|---|---|
| 2,576,935 | 12/1951 | Hayes | 280/715 X |
| 2,821,409 | 1/1958 | Chalmers | 267/256 X |
| 2,903,256 | 9/1959 | Weiss | 280/714 |
| 2,910,305 | 10/1959 | Marette et al. | 280/714 |
| 3,237,957 | 3/1966 | Harbers . | |
| 3,434,707 | 3/1969 | Raidel | 267/31 |
| 3,482,854 | 12/1969 | Masser | 280/713 |
| 3,510,149 | 5/1970 | Raidel | 267/241 X |
| 3,664,681 | 5/1972 | Thaxton | 267/256 X |
| 3,802,718 | 4/1974 | Schaeff | 267/31 X |
| 3,970,293 | 7/1976 | Sweet et al. . | |
| 4,568,094 | 2/1986 | Lovell | 280/840 |
| 4,783,096 | 11/1988 | Ramsey et al. . | |
| 4,923,210 | 5/1990 | Heider et al. | 280/712 X |
| 5,090,495 | 2/1992 | Christenson | 180/209 |

FOREIGN PATENT DOCUMENTS

| | | | |
|---|---|---|---|
| 137953 | 4/1985 | European Pat. Off. . | |
| 0236130 | 9/1987 | European Pat. Off. . | |
| 306849 | 3/1989 | European Pat. Off. . | |
| 0440571 | 8/1991 | European Pat. Off. . | |
| 2100048 | 7/1972 | Fed. Rep. of Germany . | |
| 2652811 | 5/1978 | Fed. Rep. of Germany | 180/209 |
| 3742599 | 7/1989 | Fed. Rep. of Germany . | |
| 2521502 | 8/1983 | France . | |
| 2068855 | 8/1981 | United Kingdom | 180/209 |
| 2191741 | 12/1987 | United Kingdom . | |

Primary Examiner—Margaret A. Focarino
Assistant Examiner—Paul Dickson
Attorney, Agent, or Firm—Wenderoth, Lind & Ponack

[57] ABSTRACT

An axle of a motor vehicle axle includes a rigid axle body and at least one leaf spring arrangement on each of opposite sides of a longitudinal median plane of the vehicle. The spring arrangement is hinged at a front end thereof to a chassis-stationary bearing axis and is clamped at a position spaced from such axis rigidly to the axle body. One supporting arm projects rearwardly from the axle body and forms the bottom bearing of an air spring on an upper side of which a chassis is braced and having an axle lifting mechanism. In order to achieve a maximum spring travel with relatively small overall height and simple construction so that the vehicle can be used both as a road vehicle and as a railcar under varying conditions, the air spring is braced upwardly against the free end of a swingable fork member that can be pivoted preferably in a plane parallel to the longitudinal median plane of the vehicle around a chassis-stationary bearing axis, and the pivot position of the fork member relative to the chassis is adjusted with a control element.

28 Claims, 3 Drawing Sheets

MOTOR VEHICLE AXLE SUSPENSION

BACKGROUND OF THE INVENTION

The invention relates to a suspension system or arrangement for an axle of a motor vehicle, wherein the axle includes a rigid axle body. At least one leaf spring arrangement on each of two opposite sides of a longitudinal median plane of the vehicle is hinged at a front end thereof to a chassis-stationary bearing axis and is clamped at a distance from such bearing axis rigidly to the axle body. A supporting arm projecting to the rear from the axle body forms a bottom support of an air spring having an upper side braced against the chassis and having an axle lifting mechanism.

Such a vehicle axle suspension system is known, for example, from EP-A-0 137 953. Examples of similar vehicle axis suspensions, but without an axle lifting mechanism, are disclosed in DE-P-2 100 048 and EP-A-0 306 849.

For example, so called combination trailers, which are supposed to be used both as railway cars braced at front and rear ends thereof with a chassis thereof on track-bound carrier cars and as road vehicles, require unusually long spring movements, which in conventional vehicle axle suspensions can be achieved only through extreme extension of the air spring. However, the result of such an extension is the problematic overall height and the risk of the air spring bellows bending and breaking. A similar problem with unusually long spring movements arises where semi-trailers are to be transported by tractors having varying fifth wheel coupling heights that must be accommodated or balanced by a longer spring travel or movement.

SUMMARY OF THE INVENTION

Therefore, the object of the present invention is to provide a vehicle axle suspension system or arrangement of the aforementioned type but by which unusually long spring movement with relatively small overall height and simple reliable construction can be achieved.

This object is achieved in accordance with the invention in that the air spring is braced upwardly against the free end of a swingable fork member that can be pivoted preferably in a plane parallel to the longitudinal median plane of the vehicle around a chassis-stationary bearing axis and in that the pivot position of the fork member relative to the chassis can be adjusted by a control element.

In this manner the entire standardized air spring arrangement, that already has been provided and that includes the leaf spring arrangement comprising, for example, a bearing spring leaf and a guide spring leaf, a clamp clamping the axle to a supporting arm, and the relatively short air spring, can be used. However, the air spring is not braced directly against the chassis, but rather only indirectly by means of the fork member, which can be pivoted relative to the chassis and which, depending on the extended position of the control element in variable height, forms an upper supporting plane for the air spring. When the control element is fully extended and the air spring is pressurized, and also when the control element is partially or completely retracted, the vehicle equipped with the axle suspension of the invention can be used as a road vehicle. In the case that the vehicle is to be jacked-up at the front and rear thereof as a railcar on a track-bound carrier vehicle, the control element can be completely retracted with the aid of the axle lifting mechanism and, when bleeding the air spring, the axle can also be lifted relative to the fork member, so that even unusually large lift heights, as required, for example, for Great Britain, can be achieved. With the aid of the more or less extendable control element, an adaptation to varying trailer coupling heights of tractors can be made in a simple manner so that the vehicle equipped with the axle suspension of the invention does not exceed the maximum permitted sloping position even with significant height differences in trailer couplings.

The axle suspension of the invention can be manufactured cost effectively and reliably owing to the extensive usability of standard parts. Despite the significantly increased spring travel, the overall height remains relatively small.

The control element can be designed, for example, as a pneumatic control element effective between the fork member and the chassis, so that no separate, e.g. hydraulic or electric, actuating system is necessary for the control element, but rather the compressed air supply, for example, which is necessary in any event for the air spring, can be utilized. The control element also can include an air spring bellows, which is braced upwardly against the chassis and towards the bottom on the fork member.

According to an advantageous embodiment of the inventive concept, the effective cross-sectional area of the air spring bellows of the control element can be larger than the effective area of the air spring bellows of the air spring. If then the air spring bellows of the control element and the air spring bellows of the air spring are supplied with identical pressure, when driving as a road vehicle the compression occurs exclusively from the air spring, whereas the control element does not compress due to the larger force acting on the fork member from the top, but rather acts almost like a rigid member. In this manner the proven compression properties of the air spring arrangement are maintained.

Especially advantageous geometric conditions are produced when the fork member is positioned with its front end on the chassis-stationary bearing axis so that the fork member can be pivoted in the same direction over its entire length. Thus, to further simplify the construction the leaf spring arrangement and the fork member can have a common bearing axis. The bearing axes of the leaf spring arrangement and/or the fork member can be arranged in the manner that is well-known for the leaf spring arrangement on a bearing bracket projecting downwardly from the chassis, so that the required free space to house the air suspension, the fork member and the control element is present. The bearing axis(axes) can be formed in a simple manner by a pivot pin mounted on the bearing bracket transversely to the longitudinal direction of the vehicle.

In the vehicle axle suspension known from EP-A-0 137 953, a shock absorber that is effective between the chassis and the axle body and that is hinged in the known case to the bearing bracket, on the one hand, and to the rigid axle clamp, on the other hand, is provided on both sides of the longitudinal median plane of the vehicle. Within the scope of the invention it is now proposed to hinge one end of the shock absorber to the fork member. In this manner, it is possible to employ a shock absorber that is still short despite the significantly increased spring travel, since a pivotal point of the shock absorber is pivoted to the fork member.

It is also known to equip vehicle axle suspensions, in consideration of the varying load, with an air spring valve for pressure supplied as a function of the load to the air spring, such valve being controllable by means of a linkage determining the load-dependent compression travel of the air spring. Since the more the vehicle is loaded, the more stress is placed on the air spring that thus is more compressed. In this case, in order to maintain the same vehicle height, the air spring is supplied with correspondingly more compressed air. This compensation is done by means of the air spring valve. The invention proposes to mount this air spring valve, which is usually stationary on the chassis, to the fork member itself so that operation is achieved with the conventional air spring valve and the conventional linkage, since the geometric conditions from the fork member to the axle body are similar to those in the case of the known vehicle axle suspensions between chassis and axle body. Therefore, with these features of the invention also, the construction of the vehicle axle suspension becomes even simpler and more reliable.

Especially favorable geometric conditions are produced for the vehicle axle suspension of the invention if the fork member is of a bent construction forming an obtuse angle in such a manner that one, preferably shorter arm hinged to the bearing axis slopes upwardly from the front to the rear and the other, preferably longer arm that can pivot freely extends approximately horizontally in the completely extended position of the control element. This design of the fork member also contributes to the small overall height.

Preferably the maximum swing of the fork member is limited by a mechanical stop that determines, for example, the normal driving position of the vehicle axle when using the vehicle as a combination trailer in road traffic.

When using a combination trailer as a jacked-up railcar, the vehicle axle can be locked mechanically in the lifted position, which in this case is the maximum. Such mechanical locking preferably is automatically unlocked again, e.g., when supplying pressure to the control element and/or air spring.

Within the scope of the invention, well-known axle lifting mechanisms can be used in order to lift the vehicle axle to the required degree when the control element is completely retracted or completely bled and the air suspension is bled. The axle lifting device can grasp, for example, the center of the axle body. However, it is also possible to employ a one-sided axle lift, as proposed in EP-A-0 137 953.

BRIEF DESCRIPTION OF THE DRAWINGS

Other objects, features, advantages and possible applications of the present invention will be apparent from the following description of embodiments of the invention, and with reference to the accompanying drawings, wherein all described and/or illustrated features form by themselves or in any logical combination the subject matter of the present invention, and wherein.

DETAILED DESCRIPTION OF THE INVENTION

Figure 1:
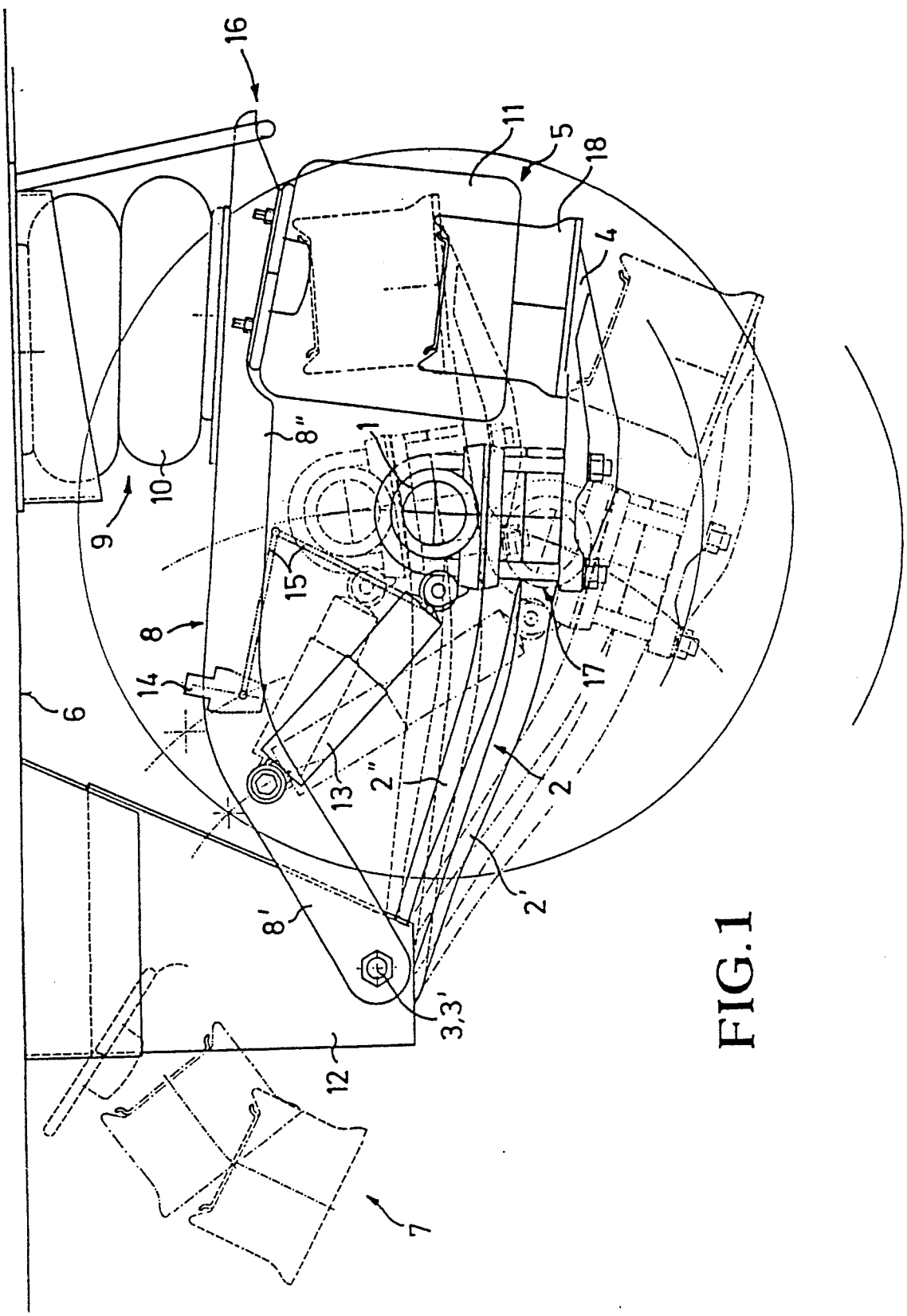
FIG. 1 is a schematic side view of a vehicle axle suspension illustrating the invention in the area of one side of a vehicle axle, where the arrangement on the opposite end of the axle is designed preferably in a corresponding manner.
Figure 2:
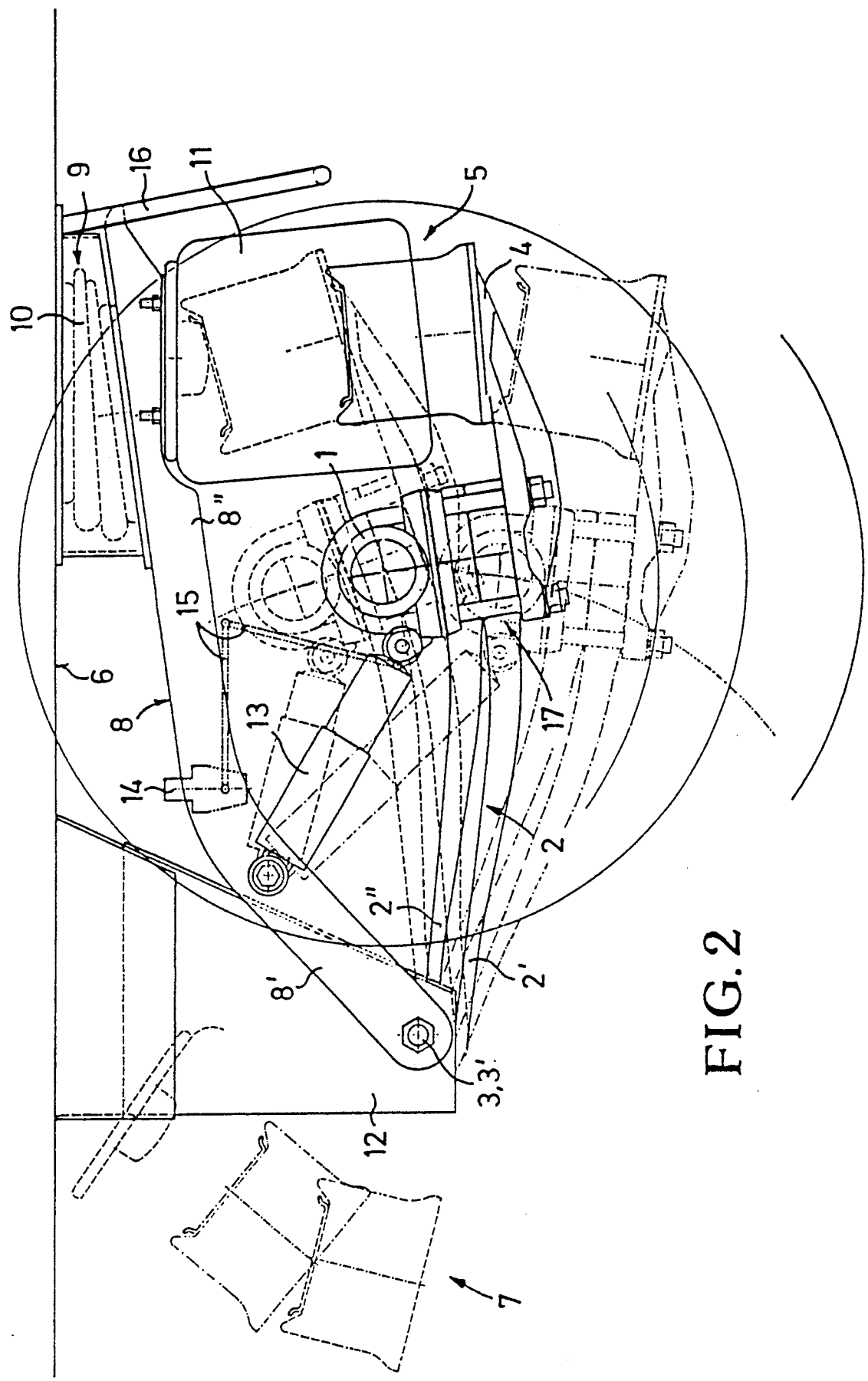
FIG. 2 is a view similar to FIG. 1, but where a control element is completely bled, whereas in the presentation of FIG. 1 it is completely pressurized.
Figure 3:
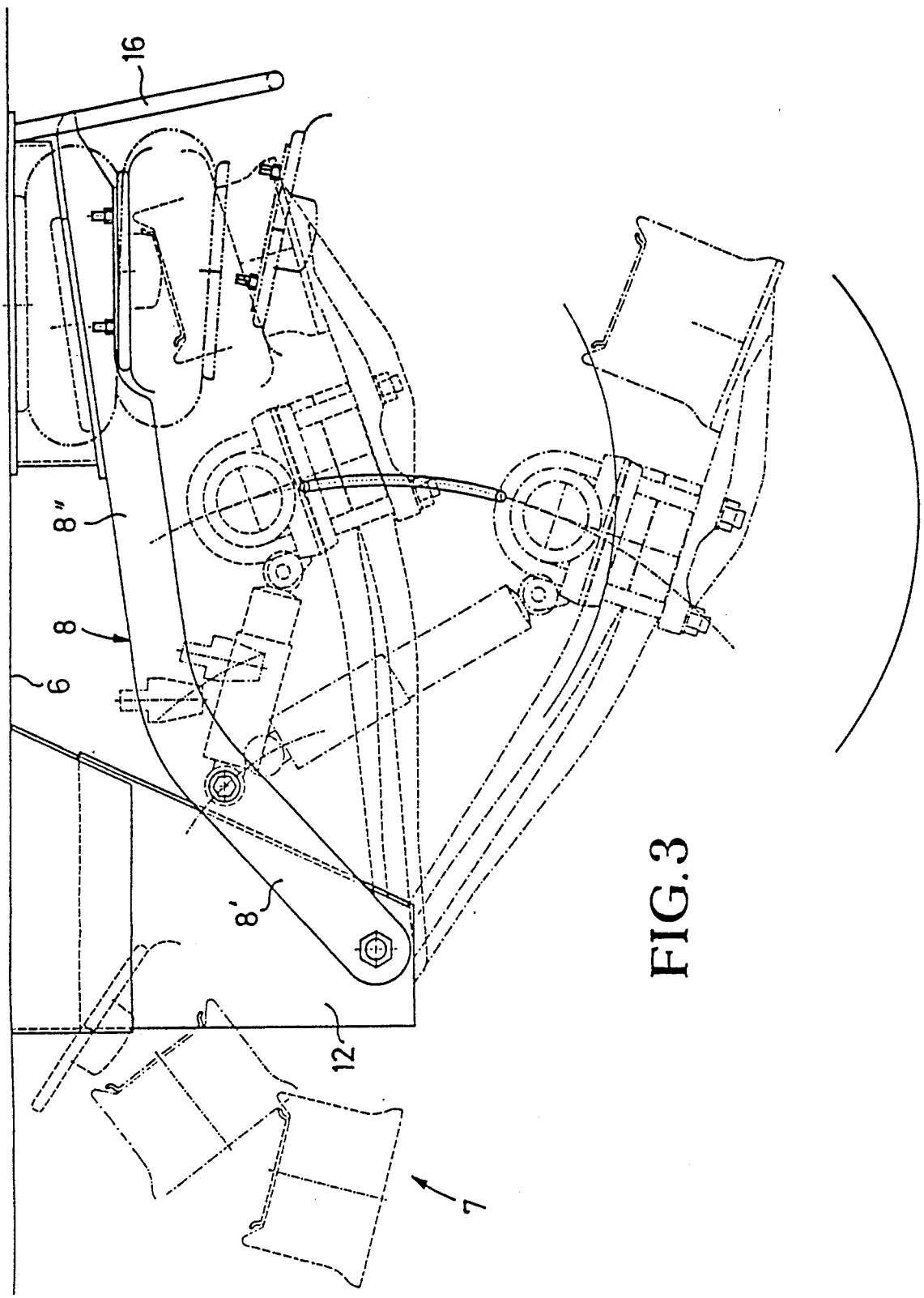
FIG. 3 is a view similar to FIG. 1, where selectable height of extension and entire possible spring travel are illustrated by varying positions of a swivel arm and possibilities of a swivel area indicated by dashed line.

The axle suspension according to FIGS. 1 to 3 is intended for a vehicle axle including rigid axle body 1. The rigid axle body is rigidly clamped, on each of opposite sides of a longitudinal median plane of the vehicle, to a leaf spring assembly or arrangement 2, which in the illustrated case comprises a bottom supporting spring leaf 2' and an upper guide spring leaf 2". Spring leaves 2', 2" are integrated at front ends thereof so as to swivel by means of spring eyes (not shown) about a pivot pin forming a bearing axis 3. Bearing axis 3 is mounted in a lower portion of a bearing bracket 12 projecting downwardly from a chassis 6. An axle clamp 17, which clamps the rear ends of the spring leaves 2', 2" to the axle body 1, includes a supporting arm 4 which projects rearwardly from the axle body 1 and which serves as a bottom bearing of an air spring 5.

The air spring 5 comprises an air spring bellows 11 and an air spring piston 18 over which the air spring bellows 11 rolls during compression. Air spring piston 18 is supported by a rear free end of supporting arm 4, and an upper end of the air spring bellows 11 is attached to the free end of a rigid swingable fork member 8 that can be pivoted about a bearing axis 3' on the bearing bracket 12. Bearing axis 3' is coincident in the illustrated example with the bearing axis 3 of the leaf spring arrangement 2, because bearing axes 3, 3' are formed by the same pivot pin. Thus, fork member 8 can be pivoted in a plane parallel to the longitudinal median plane of the vehicle.

The pivot position of fork member 8 can be adjusted relative to chassis 6 by means of a control element 9, which is formed in the case illustrated by an air spring bellows 10. Air spring bellows 10 of control element 9 is braced upwardly directly against chassis 6. Air spring bellows 10 can me pressurized from the same pressure source with which the air spring 5 is supplied. The effective cross section of air spring bellows 10 of control element 9 is greater than that of air spring bellows 11 of air spring 5, so that the compression of the vehicle axle when the vehicle is used as a road vehicle is determined by air spring 5, whereas the air spring bellows 10 of control element 9 is extended completely as far as a mechanical stop 16, e.g. formed by a clip, at the outer end of fork member 8. The dashed lines indicate the various positions that the vehicle axle and the parts interacting therewith can assume during compression and rebound.

A shock absorber 13, which is hinged at a lower end thereof to the axle clamp 17, is hinged at an upper end thereof to the fork member 8, and in particular at a position approximately one-fourth the distance of the entire length of the fork member 8 from the bearing axis 3'. FIG. 1 shows the various angular and stretching positions the shock absorber 13 assumes during compression and rebound of the vehicle axle.

Also attached to fork member 8 is an air spring valve 14, which can be actuated by means of angular linkage 15, which determines the height of the axle body 1 relative to the fork member 8. To maintain the same height with varying vehicle loads, the air spring 5 correspondingly is bled or pressurized until the desired specified height of the axle body 1 is attained.

When air spring 5 and control element 9 both are bled, the vehicle axle can be swiveled as far upwardly as shown in FIG. 2 with the aid of an axle lifting mechanism 7, which in the illustrated case is indicated by a pneumatic lift bellows, of which merely the lift piston and the bearing plate with shock absorber is indicated. The solid lines show the uppermost swivel position of fork member 8, and the dashed lines show additional uppermost swivel position of the axle body 1 with axle clamp 17 and leaf spring arrangement 2. In this furthest upwardly swiveled position, the vehicle equipped with such an axle suspension can be jacked-up as a railcar, where all of the currently mandated maximum lift heights can be met without further effort.

It is also apparent from the drawings that the fork member 8 is a bent element having a shorter arm 8' constituting about ⅓ and a longer arm 8" constituting about ⅔ of the length of the fork member 8. The shorter arm 8' is hinged at its front end to the bearing axis 3', whereas the air spring bellows 11 of air spring 5 is braced in the vicinity of the free rear end of the longer arm 8". It is apparent from FIG. 1 that with control element 9 completely pressurized, the shorter arm 8' slopes upwardly from the front to the rear, whereas the longer arm 8" extends somewhat horizontally. In this manner a small overall height is guaranteed.

I claim:

1. In a motor vehicle including a chassis, an axle, and a suspension arrangement for suspending said axle from said chassis and including a lifting mechanism for moving said axle from extended operating positions relatively spaced from said chassis to a retracted position relatively closely adjacent said chassis, the improvement wherein said suspension arrangement further comprises:
    a leaf spring assembly on each of two opposite sides of a longitudinal median plane of the vehicle, said leaf spring assembly having a front end hinged about a first bearing axis stationary to said chassis and a rear end clamped rigidly to a rigid axle body of said axle;
    a supporting arm rigid with said rear end of said leaf spring assembly and extending rearwardly from said axle body;
    a fork member hinged about a second bearing axis stationary to said chassis, such that said fork member is pivotable relative to said chassis about said second bearing axis in a plane parallel to said longitudinal median plane;
    an air spring supported at a bottom thereof by said supporting arm and having a top braced upwardly against said fork member;
    a control element for regulating the pivot position of said fork member about said second bearing axis relative to said chassis and thereby for regulating an extended operating position of said axle relative to said chassis, said control element comprising an air spring bellows positioned between said chassis and said fork member and braced upwardly by said chassis and downwardly by said fork member, said air spring bellows being operable upon pressurization thereof to pivot said fork member away from said chassis and thereby to move said axle via said air spring to said extended operating position;
    a mechanical stop fixedly and nonremovably positioned to limit, upon pressurization of said air spring bellows, the maximum pivot position of said fork member away from said chassis; and
    said lifting mechanism being operable, upon actuation thereof and upon depressurization of said air spring bellows, for moving said axle toward said retracted position thereof.

2. The improvement claimed in claim 1, wherein said air spring bellows has an effective cross-sectional area greater than that of a bellows of said air spring, such that when said air spring bellows and said bellows of said air spring are supplied with equal pressure when operating said vehicle on a road said air spring bellows substantially is not compressed.

3. The improvement claimed in claim 1, wherein said fork member has a front end hinged about said second bearing axis.

4. The improvement claimed in claim 3, wherein said fork member has a free rear end against a lower portion of which is braced said top of said air spring and against an upper portion of which is braced said air spring bellows.

5. The improvement claimed in claim 1, wherein said first and second bearing axes are coincident.

6. The improvement claimed in claim 1, wherein at least one of said first and second bearing axes is formed by a member mounted on a bearing bracket projecting downwardly from said chassis.

7. The improvement claimed in claim 6, wherein said member mounted on said bearing bracket comprises a single pin defining both said bearing axes.

8. The improvement claimed in claim 1, further comprising a shock absorber having a first end connected to said fork member and a second end connected to said axle body.

9. The improvement claimed in claim 1, wherein said fork member has an angular configuration formed by first and second arms extending at an obtuse angle relative to each other.

10. The improvement claimed in claim 9, wherein said first arm is hinged about said second bearing axis and extends upwardly and rearwardly therefrom, and said second arm extends rearwardly substantially horizontally from said first arm in a fully extended position of said air spring bellows.

11. The improvement claimed in claim 10, wherein said first arm is shorter than said second arm.

12. The improvement claimed in claim 1, wherein said air spring and said air spring bellows are pressurized from the same compressed air supply.

13. The improvement claimed in claim 1, wherein, upon depressurization of said air spring and of said air spring bellows, said actuation of said lifting mechanism moves said axle fully to said retracted position thereof.

14. The improvement claimed in claim 1, further comprising an air spring valve mounted on said fork member and operable by linkage as a function of load dependent compression movement of said air spring for supplying pressure thereto.

15. In a suspension arrangement for suspending an axle of a motor vehicle from a chassis thereof and including a lifting mechanism for moving the axle from extended operating positions relatively spaced from the chassis to a retracted position relatively closely adjacent the chassis, the improvement wherein said suspension arrangement further comprises:
    a leaf spring assembly to be mounted on each of two opposite sides of a longitudinal median plane of the vehicle, said leaf spring assembly having a front end hinged about a first bearing axis to be stationary to the chassis and a rear end to be clamped rigidly to a rigid axle body of the axle;

a supporting arm rigid with said rear end of said leaf spring assembly to extend rearwardly from the axle body;

a fork member hinged about a second bearing axis to be stationary to the chassis, such that said fork member may be pivotable relative to the chassis about said second bearing axis in a plane parallel to the longitudinal median plane;

an air spring supported at a bottom thereof by said supporting arm and having a top braced upwardly against said fork member;

a control element for regulating the pivot position of said fork member about said second bearing axis relative to the chassis and thereby for regulating an extended operating position of the axle relative to the chassis, said control element comprising an air spring bellows to be positioned between the chassis and said fork member and to be braced upwardly by the chassis and braced upwardly by said fork member, said air spring bellows being operable upon pressurization thereof to pivot said fork member away from the chassis and thereby to move the axle via said air spring to the extended operating position;

a mechanical stop fixedly and nonremovably positioned to limit, upon pressurization of said air spring bellows, the maximum pivot position of said fork member away from the chassis; and said lifting mechanism being operable, upon actuation thereof and upon depressurization of said air spring bellows, for moving the axle toward the retracted position thereof.

16. The improvement claimed in claim 15, wherein said air spring bellows has an effective cross-sectional area greater than that of a bellows of said air spring, such that when said air spring bellows and said bellows of said air spring are supplied with equal pressure when operating the vehicle on a road said air spring bellows substantially is not compressed.

17. The improvement claimed in claim 15, wherein said fork member has a front end hinged about said second bearing axis.

18. The improvement claimed in claim 17, wherein said fork member has a free rear end against a lower portion of which is braced said top of said air spring and against an upper portion of which is braced said air spring bellows.

19. The improvement claimed in claim 15, wherein the first and second bearing axes are coincident.

20. The improvement claimed in claim 15, wherein at least one of the first and second bearing axes is formed by a member to be mounted on a bearing bracket to project downwardly from the chassis.

21. The improvement claimed in claim 20, wherein said member to be mounted on the bearing bracket comprises a single pin defining both said bearing axes.

22. The improvement claimed in claim 15, further comprising a shock absorber having a first end connected to said fork member and a second end to be connected to the axle body.

23. The improvement claimed in claim 15, wherein said fork member has an angular configuration formed by first and second arms extending at an obtuse angle relative to each other.

24. The improvement claimed in claim 23, wherein said first arm is hinged about said second bearing axis to extend upwardly and rearwardly therefrom with said second arm to extend rearwardly substantially horizontally from said first arm in a fully extended position of said air spring bellows.

25. The improvement claimed in claim 24, wherein said first arm is shorter than said second arm.

26. The improvement claimed in claim 15, wherein said air spring and said air spring bellows are pressurized from the same compressed air supply.

27. The improvement claimed in claim 15, wherein, upon depressurization of said air spring and of said air spring bellows, said actuation of said lifting mechanism will move the axle fully to said retracted position thereof.

28. The improvement claimed in claim 15, further comprising an air spring valve mounted on said fork member and operable by linkage as a function of load dependent compression movement of said air spring for supplying pressure thereto.

* * * * *